L. WHITNEY.
Rotary-Churn.

No. 201,900. Patented April 2, 1878.

Witnesses:
T. C. Frink
J. F. McMahel

Inventor:
Lafayette Whitney
Per E. Frink
his Attorney

N. PETERS, PHOTO-LITHOGRAPHER, WASHINGTON, D. C.

UNITED STATES PATENT OFFICE.

LAFAYETTE WHITNEY, OF DELAWARE COUNTY, INDIANA.

IMPROVEMENT IN ROTARY CHURNS.

Specification forming part of Letters Patent No. 201,900, dated April 2, 1878; application filed November 19, 1877.

*To all whom it may concern:*

Be it known that I, LAFAYETTE WHITNEY, of Delaware county, in the State of Indiana, have invented a new and useful Improvement in Churns, of which the following is a description, reference being had to the accompanying drawings, in which—

Figure 1:
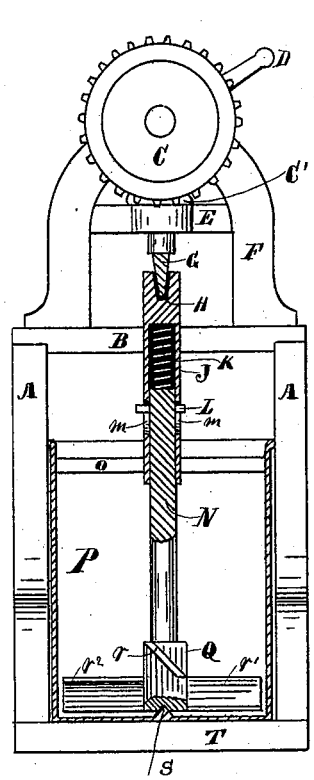
Figure 2:
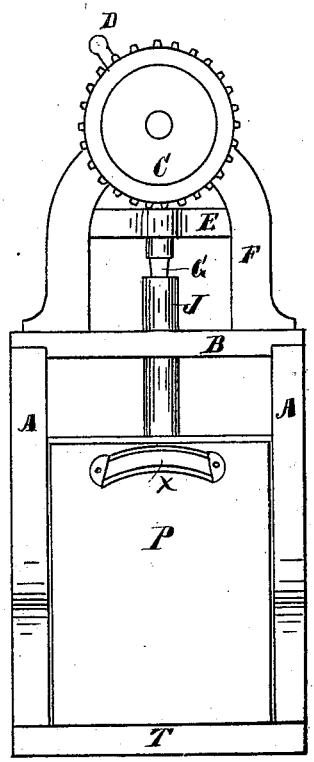
Figure 3:
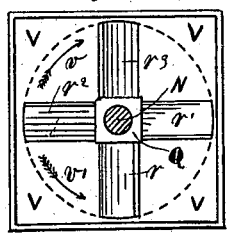
Figure 4:
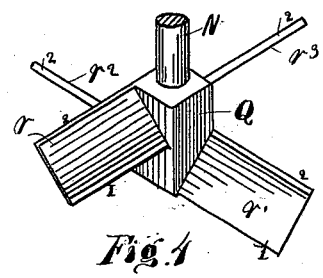

Figure 1 represents a front elevation, showing the churn-box and dasher-shaft partly in section. Fig. 2 represents a full front elevation of the same. Fig. 3 is a top view of the churn-box, showing the position of the dasher therein; and Fig. 4 is a perspective view of the dasher hub and wings.

The invention consists in an improved compound extension dasher-shaft, the application of which to churn-boxes provided with mechanical devices for revolving it makes valuable additions thereto which were heretofore unknown.

My improved churn consists of a square churn-box, provided with a compound extension-shaft, to which are attached dashers. Said shaft is to be operated by suitable gear mechanism attached to an independent frame, said frame being constructed and arranged to prevent the churn-box from being twisted around while the dashers are revolved, and the dasher-shaft is so constructed as to be readily detached from the gear mechanism on the frame, for the purpose of removing the churn-box or the dashers, or to allow the box to be readily inserted in the frame and the shaft connected with the gear mechanism.

The cream in the churn is agitated by one set of inclined wings, which are attached to the lower part of the dasher-hub, so as to force the cream in one direction, either up or down, with a centrifugal motion, and to reagitate or reverse the up-and-down motion of the cream. Another set of differently-inclined wings is attached to the same hub above and at right angles to the lower set of wings, which shall revolve in the same direction and at the same time. By operating the revolving dashers in a square churn-box the agitated cream is arrested in its centrifugal motion by coming in contact with the corners of the box, which causes the cream to be forced back toward the center of the churn, thus producing a violent and constant tumult of the cream in every direction and portion of the churn-box occupied thereby.

In the drawings, A A represent two side standards, which are secured to the base T below and to the cross-bar B above, which forms a frame to receive the churn-box P. Above the cross-bar B is secured any ordinary device for communicating a rotary motion to the dasher-shaft. For convenience, I have shown one of the ordinary mechanisms, which consists of the frame F, gear-wheels C C', and crank D. The upright shaft of the pinion C' is provided at its lower end with a square or pyramidal coupling, G, which is also in common use. The revolving dasher-shaft H is provided with a sleeve, J, of pipe, which forms a compound shaft, as shown in Fig. 1. This tube or sleeve J has one or more slots, $m$, perforated therein, so that when the coupling-pin L is inserted into the main shaft N through the slots $m$ the tube may be raised up or lowered down, when desired. The pin L acts as a sliding coupling or key, by which rotary motion is communicated to the shaft N from the sleeve J, and the dashers revolved. Inside of the tube J, and between the top of shaft N and lower part of the socket H, is placed a coil-spring, K, which operates to hold the sleeve J up, so that the socket H shall form a coupling with the square coupling G above. The lower end of the shaft N revolves on a conical bearing, S, formed in the center of the bottom of the churn-box P. The revolving dashers $r\, r^1\, r^2\, r^3$ (shown in Figs. 1, 3, and 4) are of peculiar construction and arrangement. The lower wings $r^1\, r^2$ are attached to the hub Q in a diametrical direction, and have an inclination to the horizon of about forty-five degrees. The lower edge of these wings are designed to revolve close to the bottom of the churn-box, so that when revolved in one direction they tend to throw the cream upward, and when revolved in the opposite direction they force the cream downward with a centrifugal motion. Immediately above these wings $r^1\, r^2$, and rigidly attached to the same hub Q, with a diametrical direction at right angles thereto, are two other wings, $r\, r^3$, having a reverse inclination to the line of the horizon from that of the lower wings.

By this arrangement it will be seen that when the dasher-head Q is revolved in the direction of the arrow $v$, Fig. 3, the lower dashers $r\ r^3$ force the cream upward until it comes in contact with the reverse inclined wings $r\ r^1$, when the cream is again dashed downward. At the same time a centrifugal motion is imparted to the agitated cream, which causes it to come in violent contact with the corners V of the churn-box P, which causes reaction to the motion of the cream and gives it a centripetal direction. By these combined motions the cream is kept in constant tumult until converted into butter, when the dasher and shaft Q N J can be readily removed, when required, by simply pressing the sleeve part J downward until the coupling G is released from the socket H, and the churn-box P can be removed and the butter taken therefrom; or the box may be removed for the purpose of increasing or diminishing the temperature of the cream, which can be quickly accomplished by placing the churn-box in a bath of hot or cold water until the proper temperature is obtained, after which it can be instantly reconnected with the power mechanism, and again operated.

Having thus described my invention, I claim as new and desire to secure by Letters Patent—

1. The improved compound extension dasher-shaft, consisting of the shaft N, the sleeve J, provided with slots $m\ m$ and coupling H, the pin L, and the spring K, constructed in the manner substantially as shown, for the purposes specified.

2. In combination with the compound dasher-shaft, constructed as specified, the dasher-wings $r\ r^1\ r^2\ r^3$, arranged and adapted to be operated in a churn-box, substantially as shown and described.

3. In combination with the compound dasher-shaft, constructed as described, the dashers $r\ r^1\ r^2\ r^3$, the box P, and the frame A A T B, provided with gear mechanism, all in the manner substantially as shown and described.

In testimony whereof I have signed my name to this specification in the presence of two subscribing witnesses.

LAFAYETTE WHITNEY.

Witnesses:
E. O. FRINK,
S. C. FRINK.